United States Patent [19]
Li

[11] Patent Number: 5,704,441
[45] Date of Patent: Jan. 6, 1998

[54] DRIVING CONTROLLER OF THE ELECTROMOTIVE BICYCLE

[76] Inventor: I-Ho Li, Fl. 8, No. 186, Sec. 4, Cheng Teh Rd., Taipei, Taiwan

[21] Appl. No.: 633,017

[22] Filed: Apr. 16, 1996

[51] Int. Cl.$^6$ .................................................. G05G 1/14
[52] U.S. Cl. .................................... 180/206; 180/220
[58] Field of Search .............................. 180/205, 206, 180/207, 220, 65.1; 74/594.1, 594.2, 813 C

[56] References Cited

U.S. PATENT DOCUMENTS

| | | | |
|---|---|---|---|
| 4,072,204 | 2/1978 | Leighton et al. | 180/205 |
| 4,541,500 | 9/1985 | Gelhard | 180/220 |
| 5,450,915 | 9/1995 | Li | 180/220 |
| 5,474,148 | 12/1995 | Takata | 180/220 |
| 5,560,266 | 10/1996 | Shikimori et al. | 180/220 |

*Primary Examiner*—Stephen Avila
*Attorney, Agent, or Firm*—Morton J. Rosenberg; David I. Klein; Jun Y. Lee

[57] ABSTRACT

The driving controller of a electromotive bicycle is installed on a electromotive bicycle comprising a driving motor and a battery, wherein, the large gear is installed with an arc-shaped slot, compressing spring, and two graphite brushes, and the portions of the inside and outside of the large gear are installed with an inner cover, copper film PC, outside cover, variale resistor, extending spring and other components which are matched with the check plate of the foot pedal crank and convex segment of the crank to drive the frame body to present a rotary movement by two foot pedals, thus the driving controller of the present invention is constructed. In using, when the chain is driven to rotate by the tread force on the foot pedals applied by the rider through the large gear, the current and voltage of the driving motor is provided from the battery controlled by the driving controller so that when the bicycle is in the states of actuating and climbing is driven by larger auxiliary power or the power is switched to the "off" state automatically when it is sliding down or is driving in high speed.

9 Claims, 5 Drawing Sheets

DRIVING CONTROLLER OF THE ELECTROMOTIVE BICYCLE

BACKGROUND OF THE INVENTION

1. Field of the Invention

The present invention is related to a driving controller of an electromotive bicycle, especially to an electromotive bicycle in which the magnitude and switching of the auxiliary power about the power supply of the bicycle is controlled by the tread force of the foot pedals by the rider according to the practical requirement so that the output power of the motor is controlled, thus a safe, power saving, and force saving electromotive bicycle is attained.

2. Description of the Prior Art

The requirement of a compact, power saving, and silent electromotive bicycle without air pollution is emphasized by the manufacturer and the customer. Especially, a well developed super compact motor invented by the inventor of the invention (ex., the R. O. C. appended patent No. 81108643, "Mechanic Power Motor of the electromotive bicycle", is matched with the small volume battery for installing in a compact bicycle, and the original design of the bicycle is unchanged so that an electromotive bicycle is assembled quickly and conveniently, thus said objects is attained.

Because the motor power of a electromotive bicycle is supplied from the battery on the frame of the bicycle, therefore, the primary question of the design about the control of the electromotive bicycle is to have a safe and efficiency control of power supply and to use the energy sufficiently; moreover, from the point view of power switching of the electromotive bicycle, the larger power is required during the period of actuating, low velocity and climbing, on the other hand, the less auxiliary power is required, even if to slide down to a slope, the auxiliary power is useless. If the switching system of the power is simply in corresponding to the requirement of all kinds of riders and the energy is saved vastly and safety is also improved. But, the control system of the electromotive power of the prior art can not match aforementioned requirements. In generally, the electromotive motor is attached on the frame body for driving the wheel axle and the wheel is driven by using a button to control an electromotive motor directly. The different auxiliary power is not provided automatically, thus the electromotive bicycle is a power consuming device and the operation efficiency of the motor is decreased.

According to said defects described above, in order to have a safe power saving, and force saving operation the main crucial element is the driving controller of an electromotive bicycle. But nowadays no driving controller of the prior art is corresponding to said requirements.

SUMMARY OF THE INVENTION

Accordingly, the primary object of the present invention is to provide a driving controller of an electromotive bicycle the driving source of which is the tread force of the foot pedals so the riders control the electromotive motor by the magnitude of the tread force of the foot pedals for providing a required auxiliary power, thus the motor is output with different rotary power. Therefore, a safe, power saving and force saving operation is attained.

A further object of the present invention is to provide a power saving driving controller of an electromotive bicycle, wherein when the electromotive bicycle is operated in high speed, the power will be switched to an "off" state automatically. Thus, A safety and efficiency power supply is attained.

A further object of the present invention is to provide a driving controller of an electromotive bicycle with simply constructed components. Only several compact components are required, so the space occupied is small, and the automatic operation of the present invention is adapted to all kinds of user.

DESCRIPTION OF THE DRAWINGS

The features and advantages of the present invention will be more clearly understood from the following description taken in conjection with the accompanying drawing in which.

Figure 1:
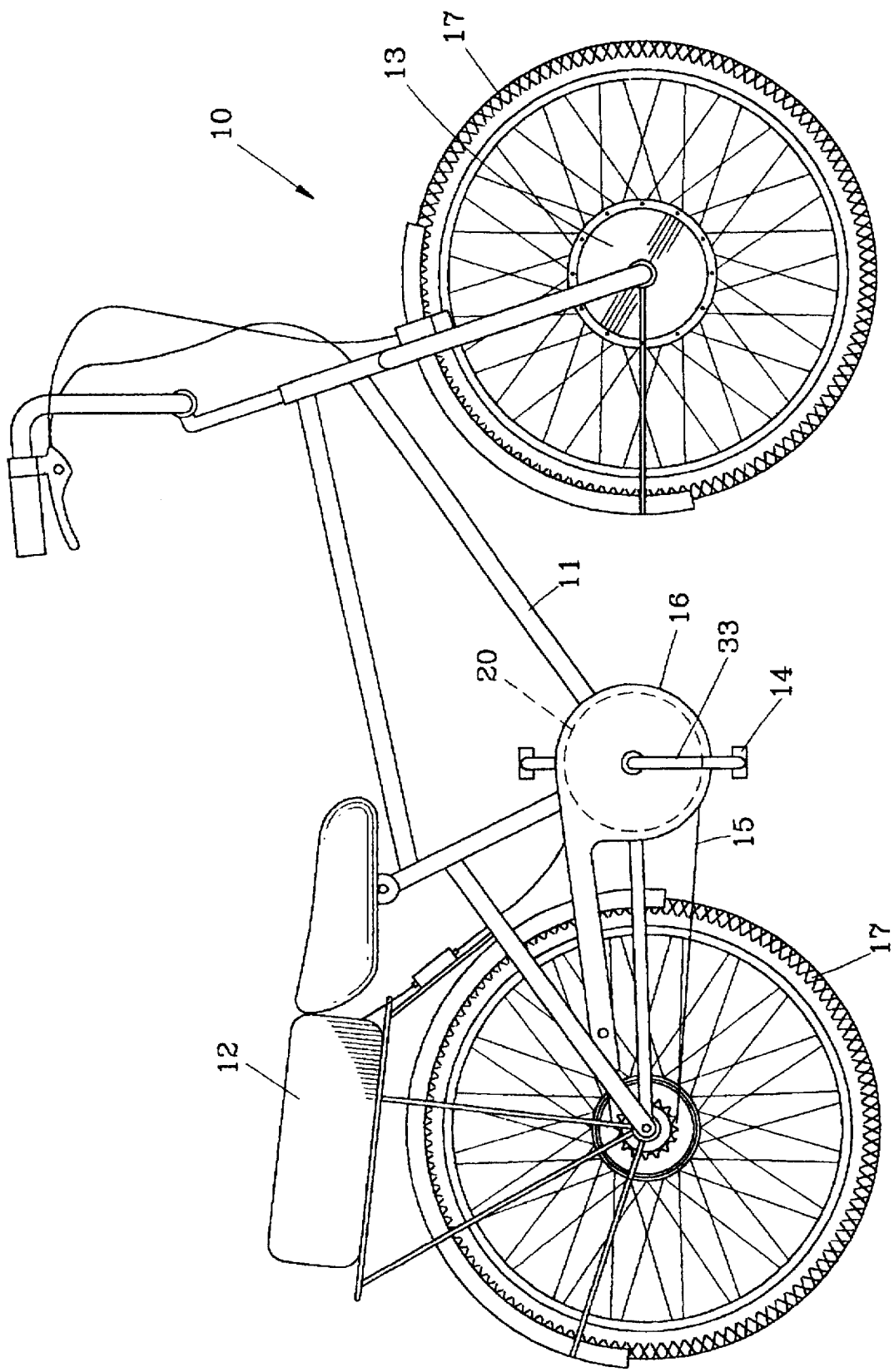
FIG. 1 is the perspective view of an electromotive bicycle in the embodiment of the present invention.

| Description of the Number in the Drawings | |
|---|---|
| 10 electromotive bicycle | 11 frame body |
| 12 battery | 13 motor |
| 14 foot pedal | 15 chain |
| 16 chain cover | 17 wheel |
| 18 gear axle | 19 square axle segment |
| 20 controller | 21 large gear |
| 22 arc-shaped slot | 23 compression spring |
| 24 slot | 25 graphite brush |
| 26 variable resistor | 27 extending spring |
| 28 PC board | 29 copprt film |
| 30 nut | 31 inner cover |
| 32 screw | 33 cranks of foot pedals |
| 34 check plate | 35 convex segment |
| 36 nut | 37 noise portion |
| 38 nut | 39 outer cover |
| 40 screw | 41 fan-shaped notch |
| 42 slinding bar | 43 axle |
| 44 lead penetrating hole | 45 thread bush |
| 46 bearing | |

DESCRIPTION OF THE PREFERRED EMBODIMENT

Figure 2:
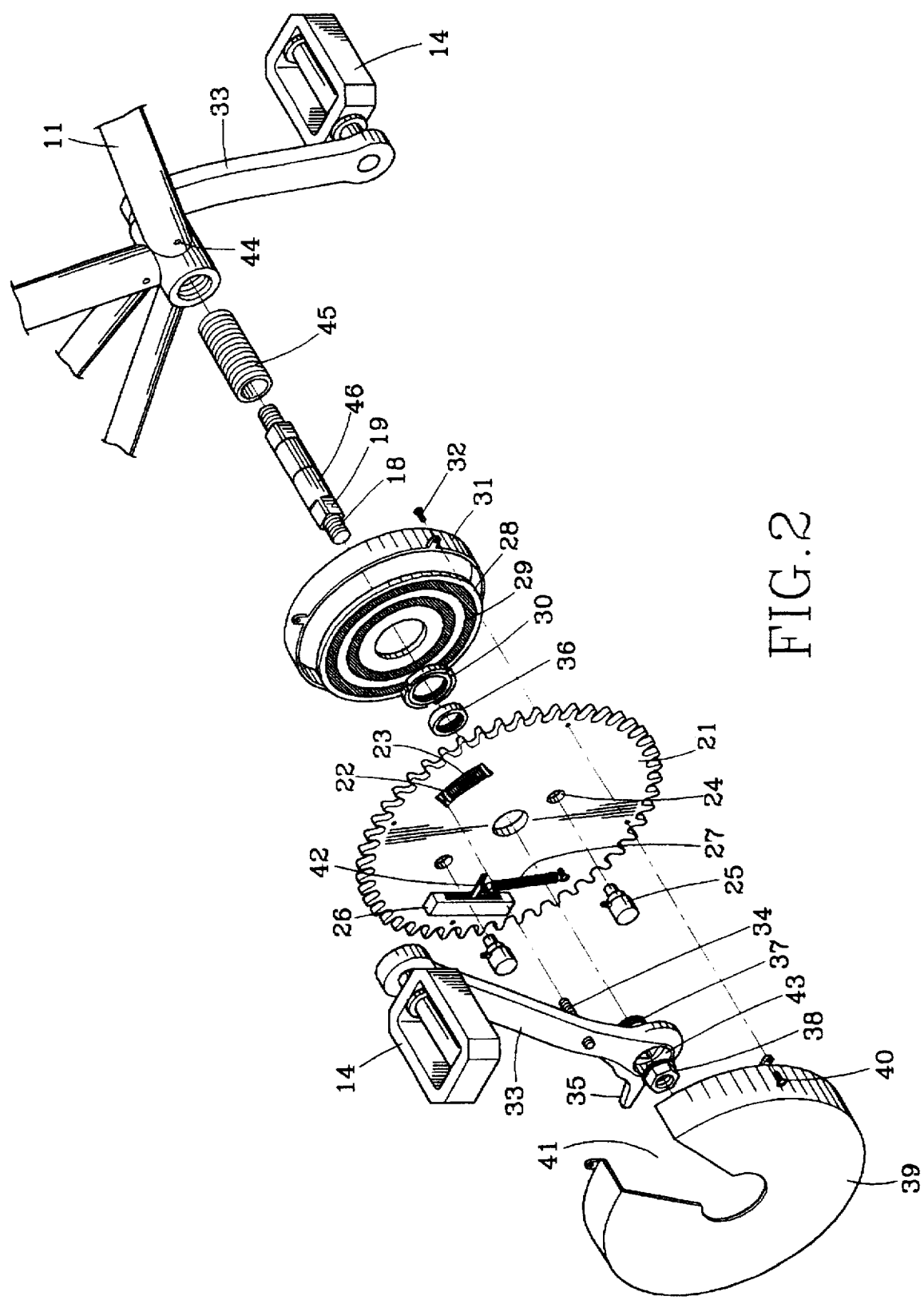
FIG. 2 is the exploded view of the assembly of the present invention.

Referring now to the FIGS. 1 and 2, the driving controller 20 of the electromotive bicycle in the present invention is installing on the portion of a large gear inside the chain cover 16 of electromotive bicycle 10 comprising battery 12 and driving motor 13; wherein, the driving motor 13 of the electromotive bicycle 10 is installed on the wheel axle of a wheel 17, a battery may be installed on a proper position of the frame body of the bicycle, such as behind the cushion. The electric connections between the battery 12, driving controlle 20 and the driving motor 13 are connected along the inner side of the tube through the lead penetrating hole 44 of the frame body 11 so that the appearance of the electromotive bicycle is similar to a generally used bicycle which is compact and is easy to control.

As shown in the FIG. 2, the driving controller 20 is located on the portion of the large gear, thus the spindle of the large gear is engaged on the gear axle 18 which is installed inside the thread bush 45 of the frame body 11 through the bearing 16. The two ends of the wheel axle 18 are hinged with the cranks 33, respectively The end the two cranks are hinged with left foot pedals and right foot pedals 14. A PC board 28 and the inside cover 31 is located inside the large gear 21 and a variable resistor 26 and outside cover 29 are located outside the big gear 21, which are matched with a check plate 34 and a noise portion 35 on the foot pedals crank 33 outside the large gear 21 and the other components on the large gear described hereinafter. In using, when the chain is driven to rotate by the tread force on the-foot pedals applied by the rider through the large gear 21, the current and voltage of the driving motor 13 are provided from the battery 12 controlled by the driving controller 20 so that when the bicycle is in the states of actuating and climbing, it is driven by a larger auxiliary power or the power is switched to the "off" state automatically when it is sliding down or is driving in high speed.

Referring to FIG. 2 again, said wheel axle 18 comprises two square axle segments 19 on the axle body thereof for engaging with the foot pedals crank 33. Assemblies located on the gear axle with thread installed thereon and different axle diameter are used for matching with the nuts 30, 38 to fix the driving controller 20 and the PC board 28 and are positioned at the distal end of the square axle segment 19.

The large gear is installed with an arc shape slot 22 on the inside of which is located with a compressing spring 23. The end faces of the large gear are installed with two slots 24, respectively. A graphite brush can be installed inside the slot 24; and the outside end face of this large gear is installed with a variable resistor 26 the sliding bar of which is extended by a extending elastic 27 and is connected to the end face of the large gear 21.

Two coaxial circular copper films 29 with different diameters is installed on the PC board 29 which is engaged with the gear axle 18 and is tightly against the frame body 11 by the nut 30 for fixedly locking with the thread bush; In the assembling of the PC board 28, each of the circular copper films 29 is compressed by the graphite brush installed on the respective location of the large gear so to form an electric connection. The outside of the PC board is covered by the inner cover 31 which is fixedly locked on the inner end face of the large gear 21 so that the PC board 28 is located inside the inner cover for preventing the pollution of dust. The rotation of the large gear will drive the inner cover to rotate 31, and said PC board will be tightly against the frame body 11 between the large gear 21 and the inner cover 31.

As shown in the FIG. 2, the curved crank 33 on the outside of the end face of the large gear comprises a foot pedal 14 which is pivotally connected to the crank 33 the front end of which is installed with an axlehole 43 installed with the noise portion 37. A convex segment 35 is installed on the outer rim of the axle hole 43, and on the proper position of the crank 33 is installed with a check bar 34; wherein, a square axle hole segment inside the axle hole 43 is used to engage with square axle segment 19 of the large gear 21 during assembling, and the noise portion is engaged with the large gear during assembling and is locked on the noise portion 37 by the nut 36 so that the large gear 21 is fixed on the crank 33. After assembling, even if the check 34 on the crank 33 is extended to the arc shape slot 22 of the large gear 21 and is compressed by the compressing spring 23, and the convex segment 35 on the front outer rim of the crank 33 is compressed on the slide bar 42 of the variable resistor 26 (as shown in the FIGS. 3 and 4), the axle hole 43 of the crank 33 is engaged with the distal end of the gear axle 18. Finally, the outer side of the large gear is fixed by the screw 40 to lock the outer cover 39 and is fixed on the end face of the large gear 21. Thus, the gear axle 18, PC board 28, inner cover 31, large cover 21, outer cover 39, etc. are assembled.

As shown in the FIG. 2, the notch 41 installed on the outer cover 39 is used to place the crank 33 after the outer cover 39 is fixed on the outside of the large gear 21 so that the assembles on the end face of the large gear 21 is safeguard by the outer cover 39 to prevent from the pollution of air and dust.

Figure 5:
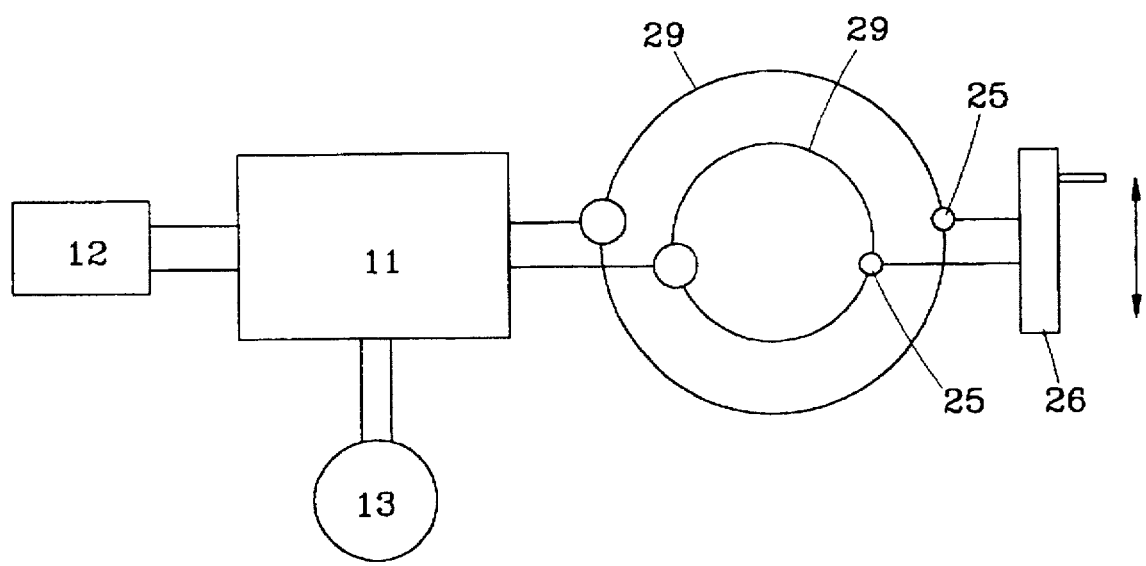
FIG. 5 is the schematic view of the circuit connection of the present invention.

Shown in the FIG. 5 are the electric connections of the present invention As shown in the FIG. 5, said variable resistors 26 is connected with two graphite brushes 25 on the large gear 21 by using two leads (which is not shown in the FIG. 2). The battery 12 is electric connected with the driving motor 13 by two circular copper film 29 to the lead penetrating hole 44 through frame body 11 by leads, thus the resistance of the variable resistor 26 is changed, i.e., the current and voltage supplied by the battery 12 is changed, therefore, different auxiliary power is output from the driving motor 13.

Figure 3:
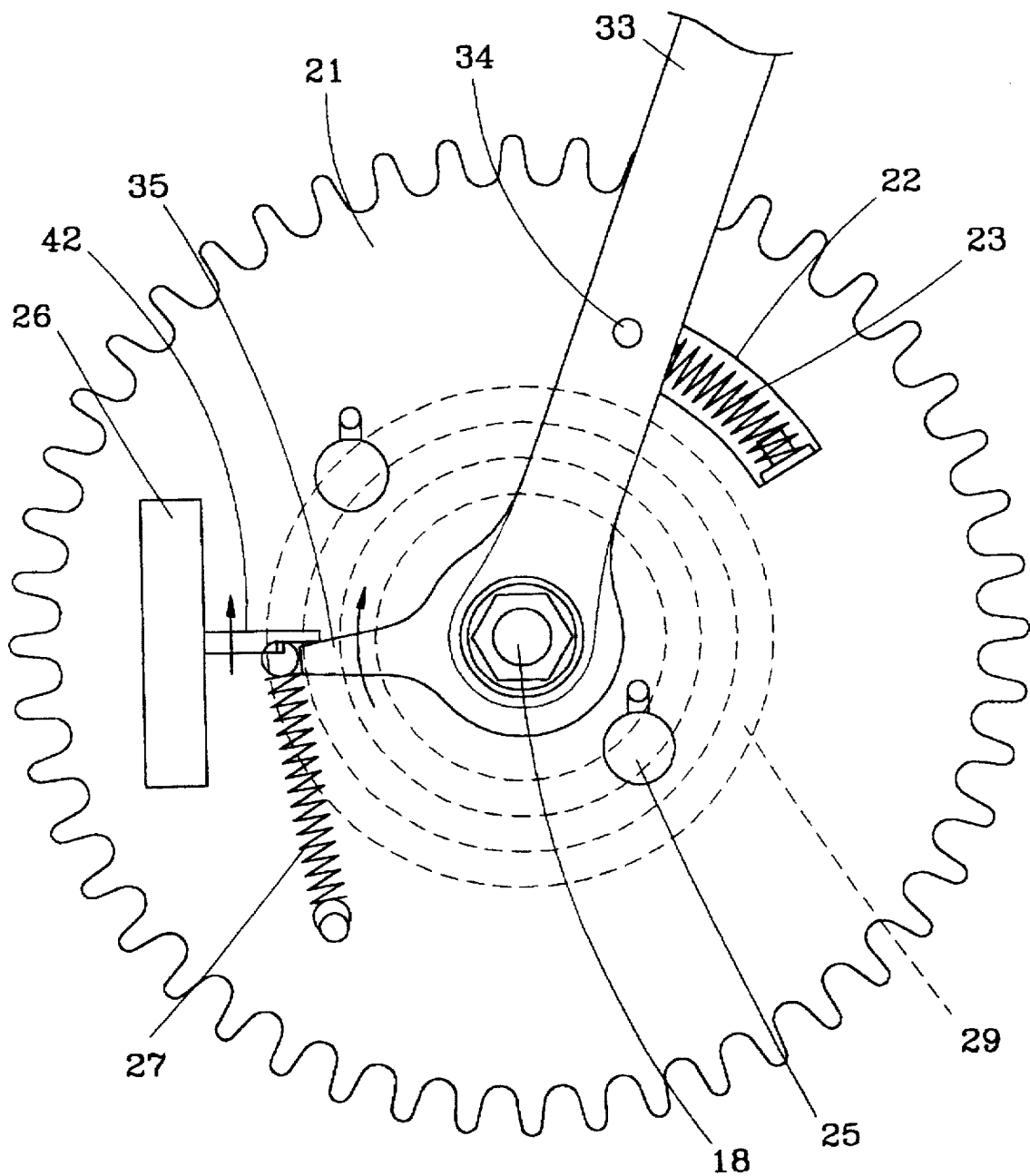
FIG. 3 is the schematic view of the present invention shown the state of the upper compression spring of a large gear which have not been compressed by the check plate.
Figure 4:
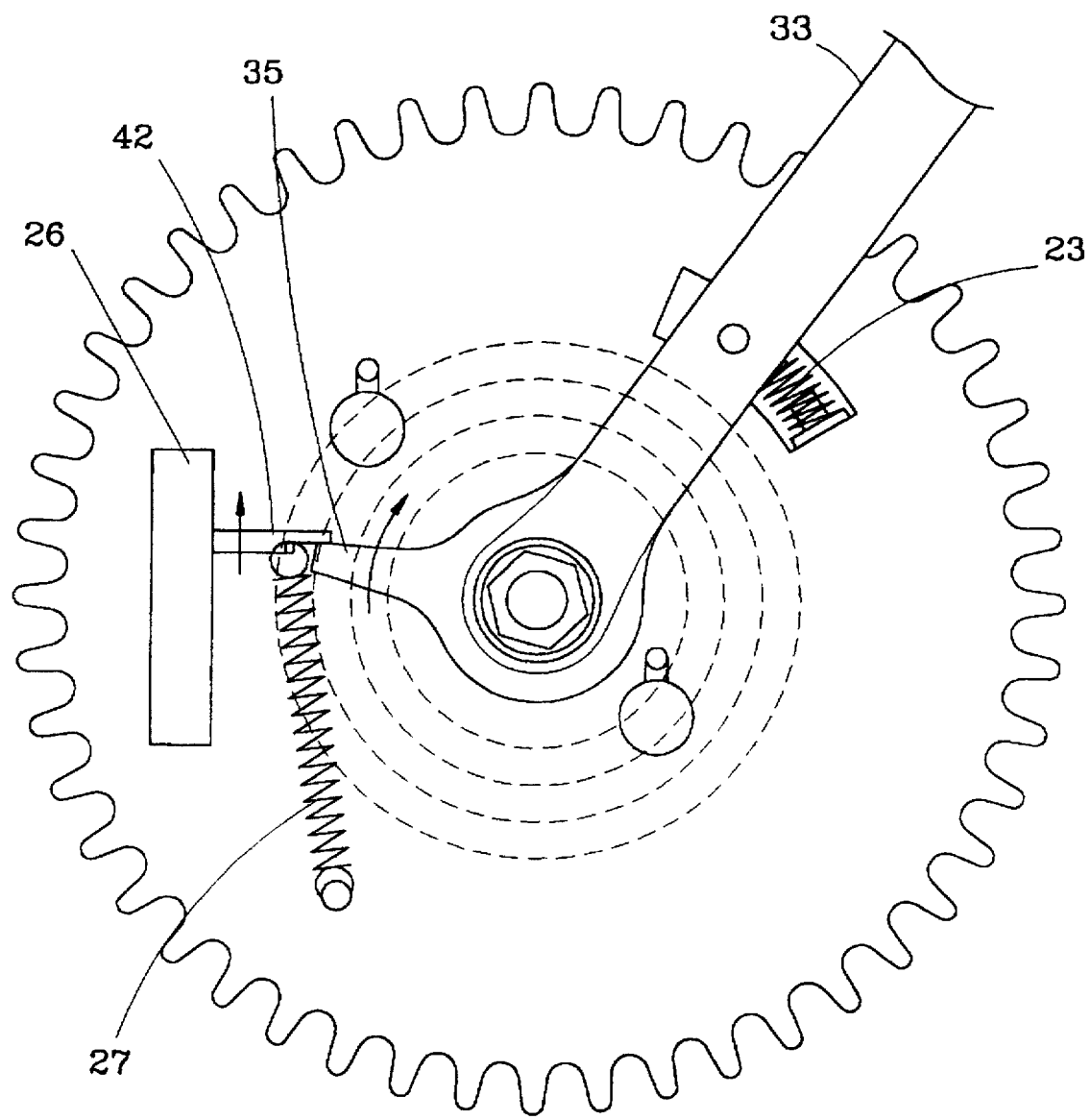
FIG. 4 is the schematic view of the operation of the present invention shown the state of the upper compression spring of a large gear which have been compressed and a variable resistor which is sled to move by a convex segment of a crank.

Shown in FIGS. 3 and 4 is the side face of the present invention having been assembled. When the foot pedals are treaded, since the large gear 21 is engaged on the noise portion 37 of the crank 33 without being fixed, the check bar 34 of the crank 33 is compressed on the compressing elastic 23 to drive the large gear 21 to rotate when the tread pressure is larger than the resistance of the compressing spring 23, the large gear 21 and the chain 15 are driven; thus, the bicycle is moved.

During the actuation of said tread action, when the crank 33 compresses the compressing spring 23 to a depth between 5 mm to 10 mm, the spring can not be further compressed, thus the large gear 21 is driven. During the process that the compressing spring is compressed, because the extension and compression of the compression spring 23, a angle displacement which is hinged between the large gear 33 and the crank 33 is caused, whereby the convex segment 35 on the crank 33 pushes the sliding bar 42 of the variable resistor 26 by the angle displacement according to the principle of lever so that the resistance of the variable resistor is changed, therefore, different powers are supplied from the battery 12 to the driving motor 13.

That is, when the electromotive bicycle is initially actuated or is climbed on the slope, because the tread force required by the foot pedals is larger, the compressing spring also suffers a great force, and the sliding bar 12 of the variable resistor is respectively pushed to a lower portion, thus the resistance of the variable resistor is very small or becomes zero, therefore, a larger resistance and voltage are supplied to the driving motor 13 by the battery 12 so the output torque and power of the driving motor are very large, whereby when the electromotive bicycle is actuated or is climbing, it will acquire a large auxiliary power form the motor 13, thus, the power is saved.

When the velocity of the bicycle is increased so the pressure applied on the foot pedals becomes small gradually, the sliding bar 42 of thevariable resistance 26 is extended by the extending spring 27 to restore to the original shape gradually, and the resistance is increased, thus the bicycle acquires a smaller auxiliary power from the driving motor 13.

When the bicycle is moved on a flat load or down from a slope, because the tread pressure of the foot pedal becomes smaller gradually, the compressing spring 23 suffers almost no pressure, thus there is no angle difference between the crank 33 and the large gear 21 according to the principle of lever, then the sliding bar of the variable 26 is not pushed, therefore, the output rotation speed and power of the driving motor 13 become zero or very small. This is the same as the power of the motor is switched to an off state. When the bicycle will be accelerated during it is moved, only to increase the tread force of the foot pedals the higher rotation speed and power of the motor 13 is attained so the bicycle is accelerated.

According to said characteristics of the present invention said hereinbefore, in fact, the components of the present invention may have slightly variation, for example, the PC board may be installed on the inner side of the large gear 21 and the two graphite brushes 25 is installed fixedly on the inner cover 31, another, the graphite brushes 25 may be replaced by a metal elastic sheet or any conductive elements; Said variable resistor may be the type of sliding line or rotation, or replaced by magnetic spring switch, variable capacitor and other electric elements which may be controlled by voltage and current; Variable resistor may also be replaced by strain gates which is installed between the end portion of the compressing spring 23 and the check bar 34 of the crank, the two leads of the strain gates is used to connect the two brushes 25 for controlling the voltage and current of a battery according to the strain gate.

Therefore, as the present invention described hereinabove, the driving source of the electromotive motor is controlled by the pressure of the foot

What is claimed is:

1. A driving controller of the electromotive bicycle installing on the portion of a large gear inside the chain cover of electromotive bicycle comprising battery and driving motor; wherein, the driving motor of the electromotive bicycle is installed on the wheel axle end of a wheel, the electric connections between the battery, driving controller and the driving motor are connected along the inner side of the tube through the lead penetrating hole of the frame body; in using, when the chain is driven to rotate by the tread force on the foot pedals applied by the rider through the large gear, the current and voltage of the driving motor are provided from the battery controlled by the driving controller so that when the bicycle is in the states of actuating and climbing, it is driven by a larger auxiliary power or the power is switched to the "off" state automatically when it is sliding down or is drivining in high speed; characterized in that: the driving controller is located on the portion of the large gear, thus the spindle of the large gear is engaged on the gear axle which is installed inside the thread bush of the frame body through the bearing, the two ends of the wheel axle are hinged with the cranks, respectively, the end the two cranks are hinged with left foot pedals and right foot pedals, a PC board and the inside cover is located inside the large gear and a variable resistor and outside cover are located outside the large gear, which are matched with a check plate and a noise portion on the foot pedal crank outside the large gear and the other components on the large gear described hereinafter.

2. The driving controller of the electromotive bicycle as claimed in claim 1, wherein said wheel axle comprises two square axle segments on the axle body thereof for engaging with the foot pedal crank, assemblies located on the gear axle with thread installed thereon and different axle diameter are used for matching with the nuts to fix the drivingcontroller, and the PC board and is positioned at the distal end of the square axle segment. pedals so that the rider can control the auxiliary power of the electromotive motor by the tread force of the foot pedals according to the practical requirement, thus different power for rotary is output from the motor so a safe, power saving, and force saving output is derived and the power is interrupted automatically during high speed operation. Moreover, the integral structure of the present invention is simple, the cost is low, and the volume is small because less components are used, thus the space occupied is small and it is adapted to all kinds of riders.

3. The driving controller of the electromotive bicycle as claimed in claim 1, wherein the large gear is installed with an arc shape slot inside of which is located with a compressing spring, the end faces of the large gear are installed with two slots, respectively, a graphite brush can be installed inside the slot; and the outside end face of this large gear is installed with a variable resistor the sliding bar of which is extended by a extending elastic and is connected to the end face of the large gear.

4. The driving controller of the electromotive bicycle as claimed in claim 1, wherein two coaxial circular copper films with different diameters is installed on the PC board which is engaged with the gear axle and is tightly against the frame body by the nut for fixedly locking with the thread bush; during the assembling of the PC board, each of the circular copper films is compressed by the graphite brush installed on the respective location of the large gear so to form an electric connection, the outside of the PC board is covered by the inner cover which is fixedly locked on the inner end face of the large gear so that the PC board 28 is located inside the inner cover.

5. The driving controller of the electromotive bicycle as claimed in claim 1, wherein a curved crank is installed on the outside of the end face of the large gear, the front end of the crank is installed with an axle hole installed with the noise portion, a convex segment is installed on the outer rim of the axle hole, and on the proper position of the crank is installed with a check bar; wherein, a square axle hole segment inside the axle hole is used to engage with square axle segment of the large gear during assembling, and the noise portion is engaged with the large gear during assembling and is locked on the noise portion by the nut so that the large gear is fixed on the crank, after assembling, even if the check plate on the crank is extended to the arc shape slot of the large gear and is compressed by the compressing spring, and the convex segment on the front outer rim of the crank is compressed on the slide bar of the variable resistor, the axle hole of the crank is engaged with the distal end of the gear axle.

6. The driving controller of the electromotive bicycle as claimed in claim 1, wherein said outer cover is installed with a fan-shaped notch, the outer cover is fixed by locking on the end face of the large gear, the fan-shaped notch is used as a space for locating the crank so that the assemblies on the end face of the large gear in positioning inside the inner cover.

7. The driving controller of the electromotive bicycle as claimed in claim 1, wherein the graphite brushes may be replaced by a metal elastic sheet or any conductive elements.

8. The driving controller of the electromotive bicycle as claimed in claim 1, wherein said variable resistor may be the type of sliding line or rotation, or replaced by magnetic spring switch, variable capacitor and other electric elements which may be controlled by voltage and current.

9. The driving controller of the electromotive bicycle as claimed in claim 1, wherein variable resistor may also be replaced by strain gates which is installed between the end portion of the compressing spring and the check bar of the crank, the two leads of the strain gates is used to connect the two brushes for controlling the voltage and current of a battery according to the strain gate.

* * * * *